Dec. 1, 1964 P. S. NOLAN 3,159,115
MONOLITHIC PALLET STRUCTURE
Filed June 5, 1963
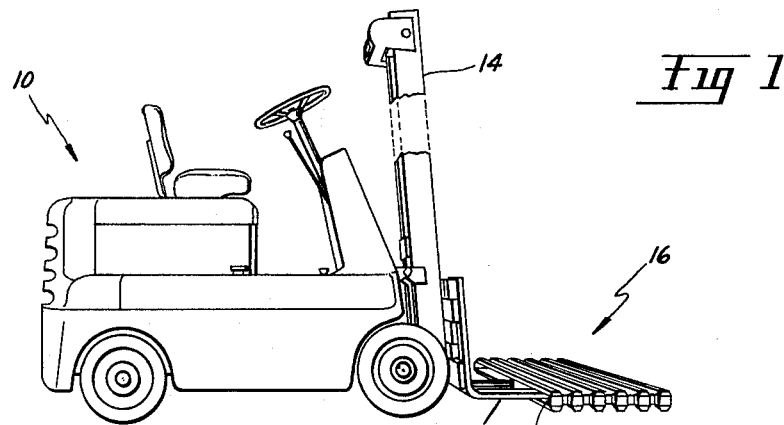
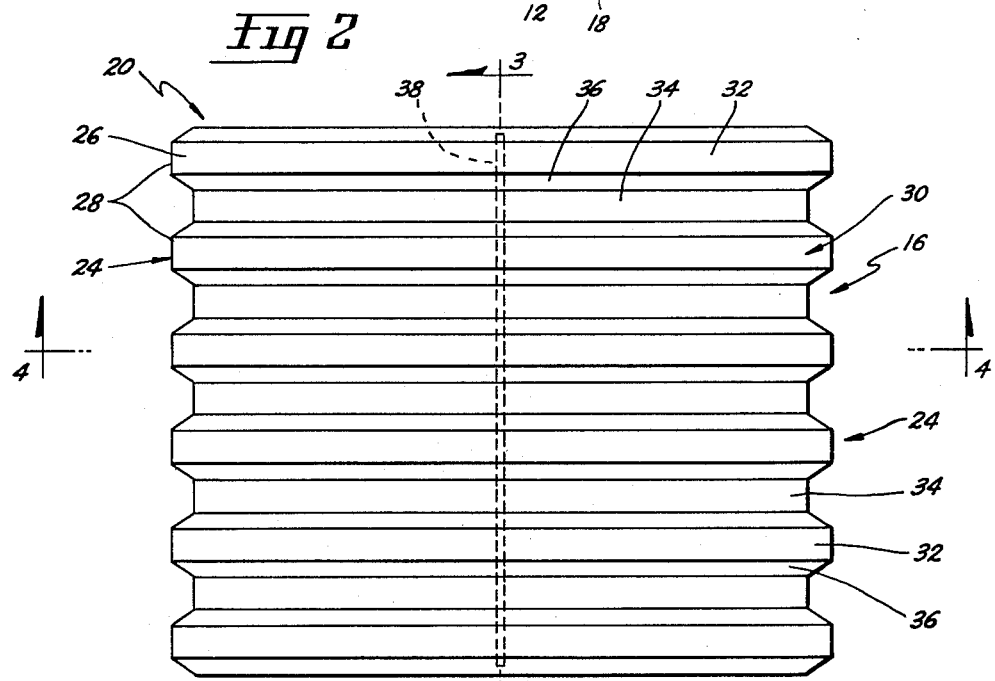
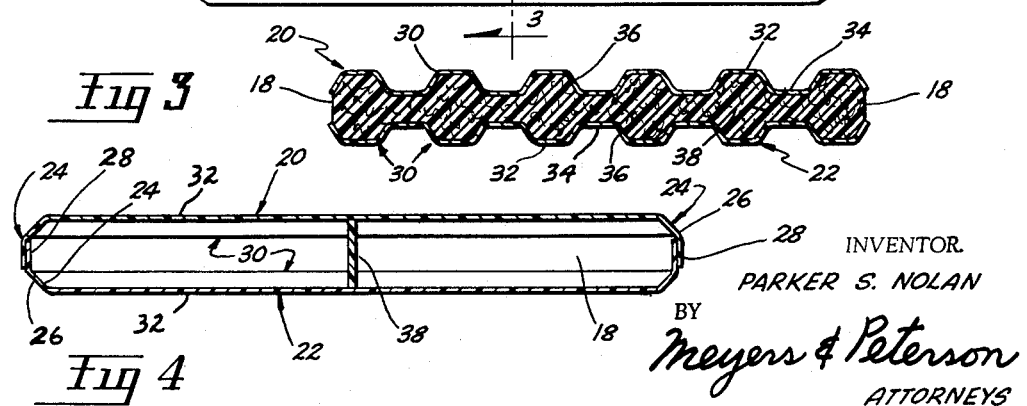
INVENTOR.
PARKER S. NOLAN
BY
Meyers & Peterson
ATTORNEYS United States Patent Office 3,159,115
Patented Dec. 1, 1964

3,159,115
MONOLITHIC PALLET STRUCTURE
Parker S. Nolan, Mound, Minn., assignor to Pal-O-Fab Co., Inc., Minneapolis, Minn., a corporation of Minnesota
Filed June 5, 1963, Ser. No. 285,767
9 Claims. (Cl. 108—51)

This invention relates generally to pallets and pertains more particularly to a monolithic pallet structure composed of glass fibers and epoxy resin.

One object of the invention is to provide a pallet having especial utility in the food processing industry where exceedingly high sanitation standards must be maintained and adhered to at all times. More particularly, the invention has for an aim the provision of a pallet that can be quickly and repeatedly washed with water and detergents or solvents, thereby permitting the pallet to be returned to service in a sanitary state capable of readily complying with all federal, state and municipal health laws and ordinances.

Another object is to provide a pallet which will possess a high ratio of strength to weight, thereby assuring that it can withstand comparatively rough usage without damage even though it is quite light.

Another object of the invention is to provide a pallet that will be long-lasting and which will retain its load carrying capabilities even when dragged over rough or abrasive floors.

A further object of the invention is to provide a plastic pallet that will not warp or become damaged when dropped or subjected to rough handling so that its utility or appearance is not in any way impaired.

Also, the invention has for an object the provision of a pallet that will require little or no maintenance or recooperage.

Yet another object of the invention is to provide a pallet of the foregoing character that is reversible, it making no difference which deck or panel member is up and which is down.

Still further, it is an object to provide a pallet having an increased compression strength and lateral rigidity for load stacking in warehouses.

It is recognized that pallets of various types and constructions have been employed in the food industry, as well as for other uses, but various shortcomings have attended the use of such pallets. For instance, wood pallets have been utilized, but they are too heavy, splinter and are subject to nail or fastener pulling which results in the puncturing of containers carried thereon. Particularly vulnerable to such a happening are thin-walled polyethylene and paper bags. Obviously, when these bags become ruptured, the contents are then unfit for human consumption and there is an accompanying waste that in most instances cannot be tolerated. In addition, it is difficult to keep wood pallets clean enough for use in conjunction with food processing operations.

Metal pallets have also been used in the past but due to warping, rivet pull, rusting and the like they cannot be counted on for use in the handling of food. Efforts to reduce warpage, unfortunately, have resulted in a pallet that is unduly heavy. Also, the cost of fabricating metal pallets has detracted from any widespread adoption thereof for food handling purposes.

It can also be mentioned that corrugated paperboard pallets have been used to some extent but these have many disadvantages, notably due to their failure when saturated with liquids and the warpage thereof out of usable shape when cleaned.

These and other objects and advantages of the invention will more fully appear from the following description, made in connection with the accompanying drawing, wherein like reference characters refer to the same or similar parts throughout the several views and in which:

FIGURE 1 is a perspective view of a forked lift truck in the process of raising a pallet fabricated in accordance with the teachings of the present invention;
FIGURE 2 is a top plan view of my pallet;
FIGURE 3 is a sectional view taken in the direction of line 3—3 of FIGURE 2, and
FIGURE 4 is a sectional view taken in the direction of line 4—4 of of FIGURE 2.

Referring first to FIGURE 1, a conventional lift truck has been denoted generally by the reference numeral 10, having forwardly directed fork elements 12 which are movable vertically along upright tracks 14. The monolithic pallet structure has been designated in its entirety by the reference numeral 16, the pallet structure having openings 18 at each end into which the fork elements 12 can be readily inserted as illustrated.

The pallet structure 16 includes virtually identical top and bottom decks or panels 20, 22 composed of glass fibers and epoxy resin having a weight ratio of 4:1. The panels 20, 22 are formed with downturned portions 24 at opposite sides thereof. More precisely, these portions 24 initially constitute inclined or sloping sections at 26 and vertical sections at 28, as best seen in FIGURE 4.

In addition to the downturned side portions 24, the panels 20, 22 are formed with longitudinal corrugations or flutes 30 comprised of flat outer or top walls 32, flat inner or bottom walls 34 and inclined side walls 36. Whereas the top and bottom walls 32, 34 are equal in width, the side walls 36 have a width or sloping height one-half that of the equal width walls 32, 34, as best viewed in FIGURE 3. As can also be discerned from FIGURE 3, the side walls 36 are disposed at approximately 53 degrees with respect to the parallel planes of the top and bottom walls 32, 34. Still further, the junctures or integral edges of the top walls 32 with the side walls 63, and the junctures of the bottom walls 34 with the side walls are preferably provided with radii of seven degrees.

The corrugations or flutes 30 not only are parallel to each other for a given panel 20 or 22, but the panels are so oriented during assembly that the corrugations or flutes of both panels 20, 22 are parallel to each other with the top walls 32 of the two panels directly opposite each other and likewise with the bottom walls directly opposite each other too. A notched reinforcing partition 38 extends transversely with respect to the corrugations or flutes 30, the notches being configured so that the partition engages the walls 32, 34 and 36 of both panels 20, 22 throughout its length. The partition 38 is composed of glass fibers and epoxy resin on the same basis as the panels 18 and 20, that is, 4:1. In most instances, the partition 38 will have the same thickness as the panels 20, 22. Thus, the partition divides the openings 18 in two at each end of the pallet structure 16, thereby leaving adequate space to either side thereof for the reception of the fork elements 12 on the lift truck 10.

The manner in which the pallet structure 16 is fabricated will now be briefly alluded to. It has already been stated that the decks or panels 20, 22 are virtually identical. In this regard, it is envisaged that the panels will be sufficiently resilient before assembly so that the sections 28 may be flexed enough in order to allow the overlap best seen in FIGURE 4. Consequently, it is intended that the panels 20, 22 be made from the same mold, although molds of slightly different size may be used.

At any rate, with the panels 20, 22 slipped or fitted together as shown in FIGURE 4 and with the partition 38 properly positioned, the three parts 20, 22 and 38 are placed in a curing oven. Curing techniques for epoxy resin compounds are well known, so need not be herein elaborated upon. It should be understood, though, that during the curing step the overlapping sections 26 of the panels 20, 22 become firmly bonded together and likewise the upper and lower edges of the partition 38 become similarly bonded to the central portions of the panels. In this way, a truly monolithic pallet structure 16 is produced having the hereinbefore mentioned desirable attributes.

Stated somewhat differently, the panels 20, 22 and partition 38 become fused into one mass during manufacture and the resulting unitary structure is devoid of any seams or weak points. Further, the whole structure embodies the strength of an elipse with the corrugations 30 extending longitudinally in one direction and the partition 38 in a transverse direction to provide superb load carrying strength and torsion, as well as resistance to abrasion, a combination not hitherto found in the pallet art.

It will, of course, be understood that various changes may be made in the form, details, arrangements and proportions of the parts without departing from the scope of the invention as set forth in the appended claims.

What is claimed:
1. A monolithic pallet structure comprising:
    (a) upper and lower corrugated panels of glass fibers and epoxy resin having their corrugations arranged generally parallel to each other,
    (b) the upper panel having downwardly directed side portions at the opposite ends of its said corrugations and the lower panel having upwardly directed side portions at the opposite ends of its said corrugations, and
    (c) the adjacent side portions of said panels overlapping each other and being bonded together to maintain the corrugations of the upper panel in a generally spaced relation with the corrugations of the lower panel.
2. A monolithic pallet structure in accordance with claim 1 in which:
    (a) said panels have sloping portions adjacent said downwardly directed portions,
    (b) said sloping portions providing shoulders on one panel against which the edges of the side portions of the other panel abut.
3. A monolithic pallet structure in accordance with claim 1 in which:
    (a) the pallet structure is open at the ends thereof.
4. A monolithic pallet structure in accordance with claim 1 in which:
    (a) said overlapping side portions are bonded together by curing said panels.
5. A monolithic pallet structure in accordance with claim 1 including:
    (a) a partition member of glass fibers and epoxy resin extending transversely to the corrugations of said panels and bonded thereto.
6. A monolithic pallet structure in accordance with claim 5 in which:
    (a) said partition member is provided with upper and lower edges notched in conformity with the corrugated cross-section configuration of said panels.
7. A monolithic pallet structure in accordance with claim 1 in which:
    (a) said panels have corrugations formed with substantially flat top and bottom walls.
8. A monolithic pallet structure in accordance with claim 7 in which:
    (a) said corrugations have side walls connecting said top and bottom walls,
    (b) said side walls being at an angle of approximately 53 degrees with respect to said top and bottom walls.
9. A monolithic pallet structure in accordance with claim 8 in which:
    (a) each top and bottom wall is approximately equal in width and each side wall has a height equal to approximately one-half the width of said top and bottom walls.

References Cited in the file of this patent
UNITED STATES PATENTS

| | | |
|---|---|---|
| 2,432,295 | Donahue | Dec. 9, 1947 |
| 2,501,506 | George | Mar. 21, 1950 |
| 2,615,661 | Gushman | Oct. 28, 1952 |
| 2,870,981 | Dellinger | Jan. 27, 1959 |
| 2,991,965 | Drieborg | July 11, 1961 |
| 3,120,825 | Johnson | Feb. 11, 1964 |